April 5, 1960   B. I. SANDOR   2,931,665
PASSENGER SAFETY DEVICE FOR VEHICLES
Filed Dec. 24, 1958   2 Sheets-Sheet 2

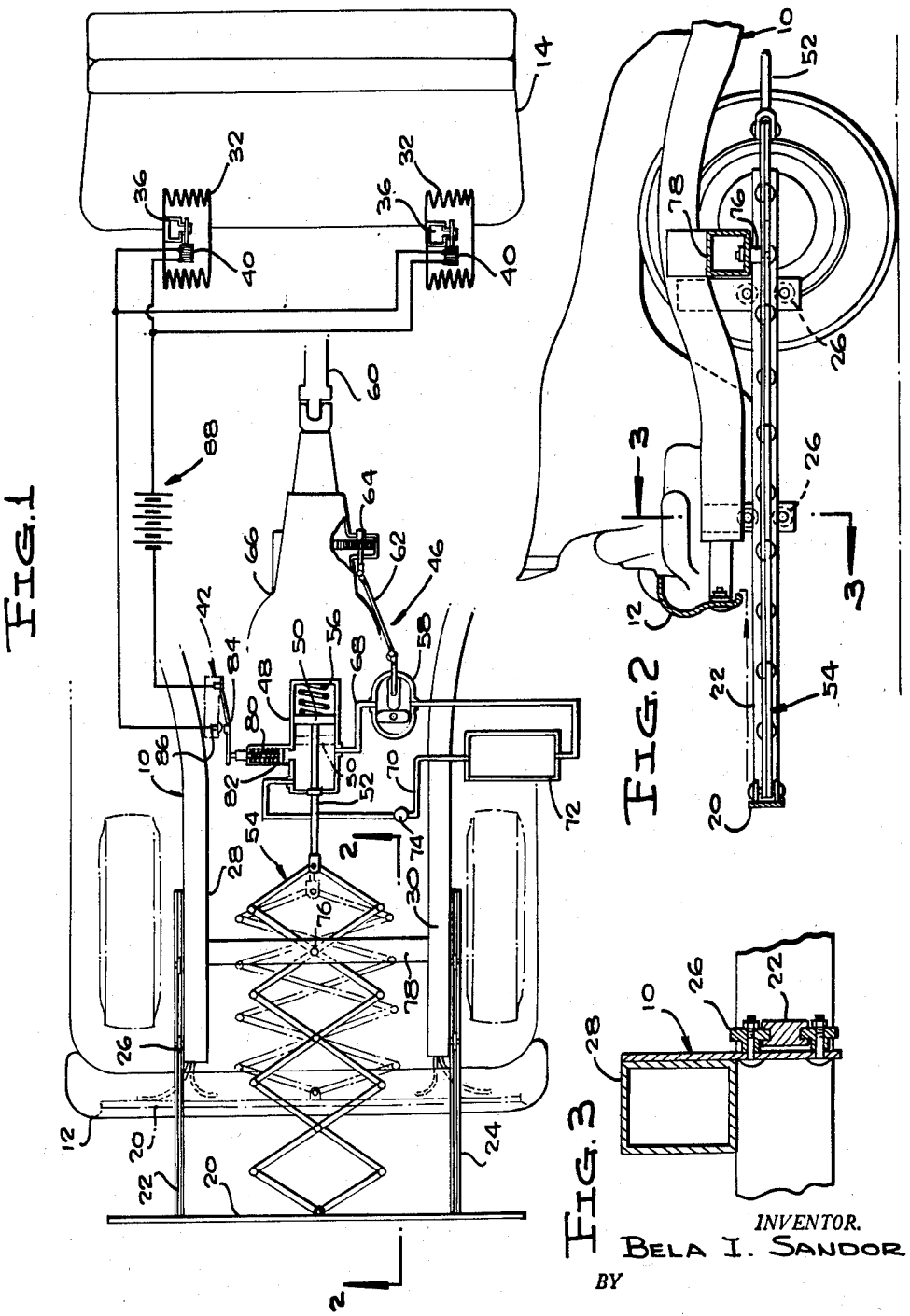

INVENTOR.
BELA I. SANDOR
BY
McMorrow, Berman & Davidson
ATTORNEYS

United States Patent Office 2,931,665
Patented Apr. 5, 1960

2,931,665

PASSENGER SAFETY DEVICE FOR VEHICLES

Bela I. Sandor, Champaign, Ill.

Application December 24, 1958, Serial No. 782,724

5 Claims. (Cl. 280—150)

The present invention relates to motor vehicles generally and specifically to a safety device for protecting a passenger of a motor vehicle against personal injury in case the vehicle crashes into a fixed or movable object.

An object of the present invention is to provide a safety device for a passenger seated in a motor vehicle which is operable upon sudden impact of the vehicle with a fixed or moving object during forward movement of the vehicle and which provides a resilient protective cushion forwardly of the passenger automatically and instantaneously after sudden impact of the vehicle.

Another object of the present invention is to provide a safety device for a passenger seated in a motor vehicle which includes an impact receiving means extended forwardly of the vehicle in response to forward movement of the vehicle.

A further object of the present invention is to provide a safety device for a passenger seated in a motor vehicle which includes an impact receiving element normally hidden from view in the forward end of the vehicle frame and which is extended forwardly by forward movement of the vehicle.

A still further object of the present invention is to provide a safety device for a passenger seated in a motor vehicle which is simple in structure, one which may be adapted for all makes of vehicles, one which is economically feasible, and one which is highly effective in action.

These and other objects and advantages of the present invention will be fully apparent from the following description when taken in conjunction with the annexed drawings, in which:

Figure 1 is a schematic view of the safety device of the present invention as installed in a vehicle, the vehicle frame being only partially shown and in dotted lines;

Figure 2 is a view taken on the line 2—2 of Figure 1;

Figure 3 is a view taken on the line 3—3 of Figure 2;

Figure 4:
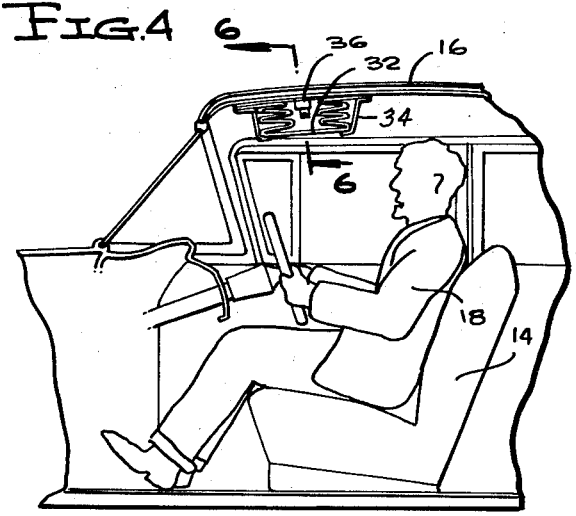
Figure 4 is a view partially in section of the passenger compartment of a motor vehicle with an operator of the motor vehicle seated on the vehicle seat and with the inflatable bag of the device of the present invention shown in folded and deflated condition.

Referring in greater detail to the drawings in which like numerals indicate like parts throughout the several views, in Figure 1 the reference numeral 10 designates a mobile frame, such as the frame of an automobile or other motor vehicle. The frame 10 has a forward end 12, a passenger seat 14 (Figures 4 and 5) inwardly of and adjacent the forward end 12 and fixedly mounted on the frame 10. A roof 16 extends in overhanging relation with respect to the seat and is carried by the frame 10.

Figure 5:
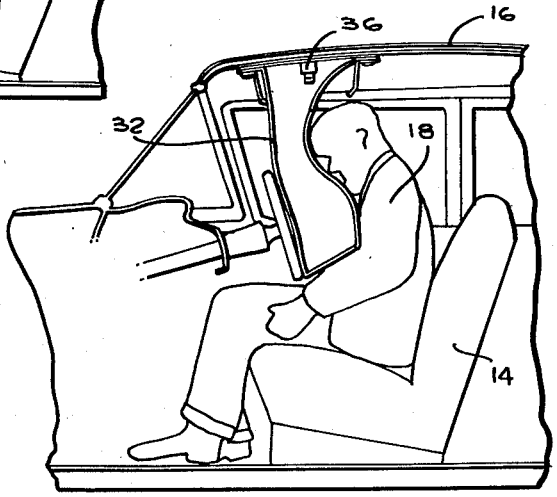
Figure 5 is a view similar to Figure 4, showing the inflatable bag of the present invention inflated as the result of a collision or impact of the vehicle with a fixed or moving object.

The device of the present invention is a safety device for protecting a passenger or operator of the motor vehicle when occupying the seat 14, such a vehicle operator being shown in Figures 4 and 5 and designated by the numeral 18.

The safety device includes a horizontally disposed crash operable element or bar 20 normally positioned contiguous to the forward end of the frame 10 and connected to the frame 10 for extensile movement ahead of the forward end of the frame 10. The extended position is shown in full lines in Figure 1 and the retracted position is shown in dotted lines. The bar 20 is mounted upon the complemental one ends of a pair of I-shaped beams 22 and 24 slidably mounted between sets of rollers 26 (Figure 3) projecting outwardly of the side frame members 28 and 30 of the frame 10.

Figure 6:
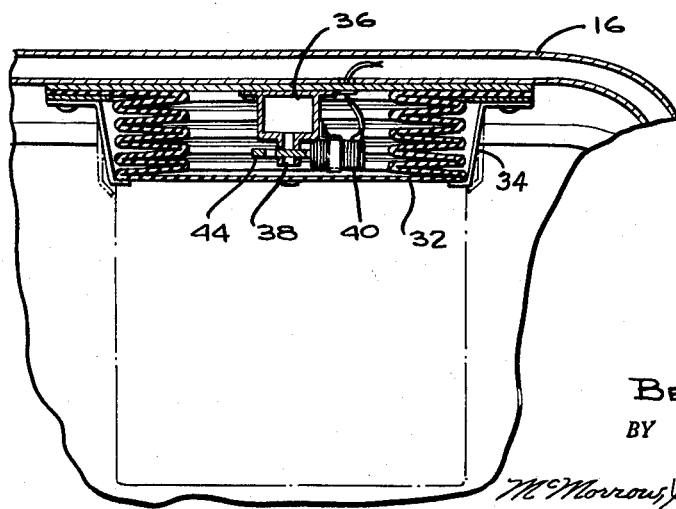
Figure 6 is a view on an enlarged scale, taken on the line 6—6 of Figure 4.

Referring to Figures 4, 5, and 6, an inflatable bag 32 is arranged in a deflated condition (Figures 4 and 6) and is positioned beneath the roof 16 forwardly of and adjacent the seat 14 and has one end fixedly secured to the roof 16.

The bag 32 is supported in its folded deflated condition beneath the roof 16 by means of a plurality of resilient fingers 34 constituting hanger means.

Electrically operated releasable gas pressure means is operatively connected to the bag 32. This means is shown in Figure 6 as being a closed container 36 adapted to contain a charge of gas under pressure and having an outlet tube 38 in communication with the interior of the bag 32. A solenoid coil 40 is mounted upon the lower end of the container 36 which is fixed to the inner upper end of the bag 32. To the coil 40 is electrically connected a switch assembly 42, shown in Figure 1. A sliding valve 44 is slidable between opening and closing positions relative to the outlet tube 38 and is shiftable to the open position when the coil 40 is energized.

The present invention includes means to effect the execution of the extensile movement of the crash element or bar 20 and also, upon a sudden impact applied to the bar 20, operates to release the gas contained in the container 36 to inflate the bag 32 and to project the inflated bag 32 to a position (Figure 5) such as to provide a protective resilient cushion for a passenger or operator 18 occupying the seat 14.

Specifically, this means, designated generally in Figure 1 by the reference numeral 46, includes a closed hydraulic fluid pressure cylinder 48 having a piston 50 slidable therein. A piston rod 52 has a portion exteriorly of the cylinder 48 with one end fixedly secured to the piston 50 and the other end secured to one end of a lazy tong linkage assembly 54. The other end of the linkage assembly 54 is secured to the bar 20.

A coil spring 56 is within the portion of the cylinder 48 between one end and the piston 50 and bears against the piston 50 to urge the piston rod 52 to the position retracting the bar 20.

The device includes means for applying fluid pressure to one side of the piston 50 in order to effect extensile movement of the bar 20 responsive to forward travel of the vehicle frame 10. This means includes a hydraulic fluid pump 58, driven by means shown schematically in Figure 1, drivably connected to the drive shaft 60 of the vehicle having the frame 10. One means of driving the pump 58 is to connect it by rotatable linkage 62 to the speedometer cable take-off gear 64 within the transmission 66 of the vehicle. The output side of the pump 58 is connected by a conduit 68 to the cylinder 48 on one side of the piston 50 and remote from the spring 56. A return conduit 70 connects the same side of the cylinder 48 with a reservoir 72 and a regulating valve 74 is in the conduit 70 between the ends thereof.

Upon forward travel of the frame 10, with rotation of the drive shaft 60 and its associated gears within the transmission 66, the pump 58 is actuated and fluid pressure is applied to the side of the piston 50 remote from the spring 56. This effects the extension forwardly of the bar 20 for the reason that the lazy tong linkage assembly 54 has an intermediate pivot point 76, embodying a vertically extending pivot pin, anchored on a frame cross member 78. Movement of the piston 50 to the right in Figure 1 effects the extensile movement of the linkage assembly 54 and subsequent forward movement of the bar 20.

Pressure responsive means is operatively connected to the cylinder 48 and operates upon a sudden impact applied to the bar 20 to release the gas pressure from the container 36. This means consists in a pressure cylinder 80 having one end closed and the other end open with the open end connected in communication with the interior of the cylinder 48 on the side of the piston 50 remote from the spring 56. Within the cylinder 80 is a spring-biased plunger 82 which is acted upon by the pressure in the cylinder end to close the movable contact 84 into electrical engagement with the fixed contact 86 of the electrical switch 42.

The switch 42 is in circuit with the battery 88 of the vehicle having the frame 10 and is in circuit with both of the solenoid coils, as shown in Figure 1, in which is shown a bag 32 located contiguous to the portions of the seat 14 which will be occupied by the operator of the vehicle and by a passenger riding in the vehicle.

Figure 7:
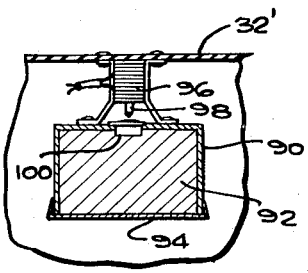
Figure 7 is a view in section of a modified form of the bag inflating means.

In Figure 7 is shown a modification of the releasable gas pressure means for inflating the bag 32'. This means consists in a container 90 having a charge of gas-producing combustible or explosive material 92 therein. A protective cover 94 extends over the open end of the container 90 and protects the material 92 against loss from the container 90. An electric plunger assembly 96 has a firing pin 98 extendable out of the assembly 96 upon energization of the latter with the firing pin 98 in alignment with a primer cap 100 seated in the closed end of the container 90. Upon firing of the primer cap 100 by closing of the switch 42 to which the assembly 96 is connected electrically, the material 92 forms a charge of gas sufficient to inflate the bag 32' to the inflated condition shown in Figure 5 with respect to the bag 32.

In operation, upon forward movement of the mobile frame 10 and rotation of the drive shaft 60, the pump 58 applies pressure to the one side of the piston 50 sufficient to compress the spring 56 and permit movement of the piston 50 to the position in which the bar 20 moves from the dotted line position in Figure 1 to the full line and extended position forwardly of the frame 10. The spring of the spring-biased plunger 82 and the cylinder 80 is of such strength that fluid pressure within the cylinder 48 on the side of the piston 50 remote from the spring 56, as regulated by the valve 74, is not sufficient to actuate the extensile movement of the plunger 82 to close the switch 42 but, upon impact of the bar 20 with a fixed or moving object, the piston 50 is drawn to the left in Figure 1 to increase suddenly the pressure within the one end portion of the cylinder 48 which increase in pressure is transmitted by the plunger 82 to the movable contact 84, thus closing the switch 42 and energizing either the coils 40 or the assembly 96, resulting in inflating the bag 32, 32' and projecting the same to a position in which the bag 32, 32' forms a protective resilient cushion for the vehicle operator or passenger.

What is claimed is:

1. The combination with a mobile frame having a forward end, a passenger seat inwardly of and adjacent the forward end of said frame and fixedly mounted on said frame, and a roof carried by said frame and extending in overhanging relation with respect to said seat, of a safety device for protecting passengers when occupying said seat, said device including a crash operable element normally positioned contiguous to the forward end of said frame and connected to said frame for extensile movement ahead of the forward end of said frame, an inflatable bag arranged in a deflated condition positioned beneath said roof adjacent said seat and carried by said roof, releasable gas pressure means operatively connected to said bag, and means to effect the execution of the extensile movement of said crash element and operable upon a sudden impact applied to said extended crash element, said means including a closed hydraulic fluid cylinder, a piston slidable within said cylinder and connected to said crash element for movement therewith, means applying fluid pressure to one side of said piston to effect extensile movement of said element responsive to forward travel of said vehicle frame, and pressure responsive means operatively connected to said cylinder and operating upon a sudden impact applied to said projected crash element to release said gas pressure, inflate said bag, and project said inflated bag to a position such as to provide a protective resilient cushion for a passenger when occupying said seat.

2. The combination with a mobile frame having a drive shaft rotatably mounted in said frame, a forward end, a passenger seat inwardly of and adjacent the forward end of said frame and fixedly mounted on said frame, and a roof carried by said frame and extending in overhanging relation with respect to said seat, of a safety device for protecting passengers when occupying said seat, said device including a crash operable element normally positioned contiguous to the forward end of said frame and connected to said frame for extensile movement ahead of the forward end of said frame, an inflatable bag arranged in a deflated condition positioned beneath said roof adjacent said seat and carried by said roof, releasable gas pressure means operatively connected to said bag, and means to effect the execution of the extensile movement of said crash element and operable upon a sudden impact applied to said extended crash element, said means including a closed hydraulic fluid cylinder, a piston slidable within said cylinder and connected to said crash element for movement therewith, means embodying a fluid pump operatively connected to said drive shaft applying fluid pressure to one side of said piston to effect extensile movement of said element responsive to forward travel of said vehicle frame, and pressure responsive means operatively connected to said cylinder and operating upon a sudden impact applied to said projected crash element to release said gas pressure, inflate said bag, and project said inflated bag to a position such as to provide a protective resilient cushion for a passenger when occupying said seat.

3. The combination with a mobile frame having a forward end, a passenger seat inwardly of and adjacent the forward end of said frame and fixedly mounted on said frame, and a roof carried by said frame and extending in overhanging relation with respect to said seat, of a safety device for protecting passengers when occupying said seat, said device including a crash operable element normally positioned contiguous to the forward end of said frame and connected to said frame for extensile movement ahead of the forward end of said frame, an inflatable bag arranged in a deflated condition positioned beneath said roof adjacent said seat and carried by said roof, electrically operable releasable gas pressure means operatively connected to said bag, and means to effect the execution of the extensile movement of said crash element and operable upon a sudden impact applied to said extended crash element, said means including a closed hydraulic fluid cylinder, a piston slidable within said cylinder and connected to said crash element for movement therewith, mean applying fluid pressure to one side of said piston to effect extensile movement of said element responsive to forward travel of said vehicle frame, and pressure responsive means embodying a fluid pressure operated electrical switch operatively connected to said cylinder and operating upon a sudden impact applied to said projected crash element to release said gas pressure, inflate said bag, and project said inflated bag to a position such as to provide a protective resilient cushion for a passenger when occupying said seat.

4. The combination with a mobile frame having a drive shaft rotatably mounted in said frame, a forward end, a passenger seat inwardly of and adjacent the forward end of said frame and fixedly mounted on said frame, and a roof carried by said frame and extending in overhanging relation with respect to said seat, of a safety device for protecting passengers when occupying said seat, said device including a crash operable element normally positioned contiguous to the forward end of said frame and connected to said frame for extensile movement ahead of the forward end of said frame, an inflatable bag arranged in a deflated condition positioned beneath said roof adjacent said seat and carried by said roof, electrically operable releasable gas pressure means operatively connected to said bag, and means to effect the execution of the extensile movement of said crash element and operable upon a sudden impact applied to said extended crash element, said means including a closed hydraulic fluid cylinder, a piston slidable within said cylinder and connected to said crash element for movement therewith, means embodying a fluid pump operatively connected to said drive shaft applying fluid pressure to one side of said piston to effect extensile movement of said element responsive to forward travel of said vehicle frame, and pressure responsive means embodying a fluid pressure operated electrical switch operatively connected to said cylinder and operating upon a sudden impact applied to said projected crash element to release said gas pressure, inflate said bag, and project said inflated bag to a position such as to provide a protective resilient cushion for a passenger when occupying said seat.

5. The combination with a mobile frame having a forward end, a passenger seat inwardly of and adjacent the forward end of said frame and fixedly mounted on said frame, and a roof carried by said frame and extending in overhanging relation with respect to said seat, of a safety device for protecting passengers when occupying said seat, said device including a crash operable element normally positioned contiguous to the forward end of said frame and connected to said frame for extensile movement ahead of the forward end of said frame, an inflatable bag arranged in a deflated condition positioned beneath said roof adjacent said seat and carried by said roof, releasable gas pressure means operatively connected to said bag, means to effect the execution of the extensile movement of said crash element and operable upon a sudden impact applied to said extended crash element, said means including a closed hydraulic fluid cylinder, a piston slidable within said cylinder and connected to said crash element for movement therewith, means applying fluid pressure to one side of said piston to effect extensile movement of said element responsive to forward travel of said vehicle frame, and pressure responsive means operatively connected to said cylinder and operating upon a sudden impact applied to said projected crash element to release said gas pressure, inflate said bag, and project said inflated bag to a position such as to provide a protective resilient cushion for a passenger when occupying said seat, and spring means within the portion of said cylinder adjacent the other side of said piston operatively connected to said piston for urging said crash element to the normal position.

References Cited in the file of this patent

UNITED STATES PATENTS

| 2,834,606 | Bertrand | May 13, 1958 |
| 2,842,372 | D'Antini | July 18, 1958 |

FOREIGN PATENTS

| 896,312 | Germany | Nov. 12, 1953 |